(12) United States Patent
Aitken et al.

(10) Patent No.: US 8,768,902 B2
(45) Date of Patent: Jul. 1, 2014

(54) UNIFIED CONCURRENT CHANGES TO DATA, SCHEMA, AND APPLICATION

(75) Inventors: William Emeric Aitken, Mercer Island, WA (US); Noaa Avital, Seattle, WA (US); Quetzal Bradley, Monroe, WA (US); Bradford Lovering, Clyde Hill, WA (US); Stephen J. Millet, Edmonds, WA (US); Brad Olenick, Redmond, WA (US); Pedram Faghihi Rezaei, Seattle, WA (US); Simon David Kent, Redmond, WA (US); Haroon Ahmed, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 547 days.

(21) Appl. No.: 12/813,577

(22) Filed: Jun. 11, 2010

(65) Prior Publication Data
US 2011/0307524 A1 Dec. 15, 2011

(51) Int. Cl.
*G06F 17/30* (2006.01)
*G06F 17/00* (2006.01)

(52) U.S. Cl.
CPC .................... *G06F 17/30* (2013.01); *G06F 17/00* (2013.01)
USPC ............ 707/703; 707/609; 707/802; 707/803

(58) Field of Classification Search
CPC ................................ G06F 17/00; G06F 17/30
USPC .......... 707/602, 608–609, 615, 703, 802–803
See application file for complete search history.

(56) References Cited

U.S. PATENT DOCUMENTS

| | | | |
|---|---|---|---|
| 6,816,873 B2 | 11/2004 | Cotner et al. | |
| 7,206,805 B1 | 4/2007 | McLaughlin | |
| 7,454,435 B2 | 11/2008 | Friedman et al. | |
| 2003/0061207 A1* | 3/2003 | Spektor | 707/3 |
| 2003/0236859 A1* | 12/2003 | Vaschillo et al. | 709/218 |
| 2005/0010572 A1* | 1/2005 | Clark et al. | 707/10 |
| 2005/0071359 A1* | 3/2005 | Elandassery et al. | 707/102 |
| 2005/0125430 A1* | 6/2005 | Souder et al. | 707/100 |

(Continued)

FOREIGN PATENT DOCUMENTS

WO WO 2005013155 * 10/2005

OTHER PUBLICATIONS

G. Gardarin et all., "Proving Consistency of Database Transactions", 1979 IEEE, 291-298.*

(Continued)

*Primary Examiner* — Srirama Channavajjala
(74) *Attorney, Agent, or Firm* — Nicholas Chen; Kate Drakos; Micky Minhas

(57) ABSTRACT

Changes are managed in a multi-user database application environment. Proposed changes are collected, including changes to data, schema, and/or application descriptions. A user may specify foreign key relationships between items belonging to one or more of these categories. A view is produced showing the impact proposed changes would have on the environment if successfully committed. The user's proposed changes are ordered according to their dependencies, and submitted for committal together in a single transaction, subject to optimistic concurrency and consistency checks. For example, a proposed change to a data value may be inconsistent with a change which removed a data element containing the data value. The commitment operation may return identifiers and other return values, in addition to indicating whether the commitment was successful.

20 Claims, 3 Drawing Sheets

(56) References Cited

U.S. PATENT DOCUMENTS

| | | | |
|---|---|---|---|
| 2005/0289198 A1* | 12/2005 | Todd | 707/204 |
| 2006/0041544 A1* | 2/2006 | Santosuosso | 707/4 |
| 2006/0161558 A1* | 7/2006 | Tamma et al. | 707/100 |
| 2006/0248128 A1 | 11/2006 | Acharya et al. | |
| 2007/0219999 A1 | 9/2007 | Richey et al. | |
| 2009/0037769 A1* | 2/2009 | Babkin et al. | 714/15 |
| 2009/0217274 A1* | 8/2009 | Corbin et al. | 718/101 |
| 2009/0288069 A1 | 11/2009 | Kent et al. | |
| 2010/0030767 A1 | 2/2010 | Kim et al. | |

OTHER PUBLICATIONS

Yonglak Sohn et all., "Transaction Scheduling in Multi-Level Secure Database Systems",1994 IEEE, pp. 216-223.*

Bednárek, et al., "Data Integration Using DataPile Structure", Retrieved at << http://ftp.informatik.rwth-aachen.de/Publications/CEUR-WS/Vol-152/paper11.pdf >>, Proceedings 9th East-European Conference on Advances in Database and Information Systems (ADBIS), 2005, pp. 178-188.

"Data Concurrency and Consistency", Retrieved at << http://download.oracle.com/docs/cd/B10501_01/server.920/a96524/c21cnsis.htm >>, Retrieved Date: Apr. 26, 2010, pp. 34.

* cited by examiner

UNIFIED CONCURRENT CHANGES TO DATA, SCHEMA, AND APPLICATION

BACKGROUND

A multi-user database includes data organized for one or more uses by multiple people. Databases may be classified by the kind of data they contain, such as bibliographic, full-text, numeric, image, and so on. Databases may also be classified according to the database model they use to organize data and represent data relationships, such as a relational model, a hierarchical model, or a network model, for example. A database schema describes database structure in a formal language supported by a database management system (DBMS). In a relational database, for example, the schema may define tables, fields, relationships, views, indexes, packages, procedures, functions, queues, triggers, types, sequences, materialized views, synonyms, database links, directories, and other aspects of a database. Schemas are sometimes stored in a data dictionary.

Database schemas may be created, accessed, and/or modified during various utilizations of the database, or in preparation for such utilizations. During database development, for example, a schema can be used to define and organize the content, relationships, and structure of the data the database is designed to hold. During database interrogation, users access the data in a database for information retrieval and report generation, in accordance with the database's schema. During database maintenance, data is added, deleted, or updated in accordance with the database's schema. Database interrogation and database maintenance are often performed using a database application, which may be a general-purpose DBMS or a special-purpose application. During application development, the schema supports development of data entry screens, queries, forms, reports, tables, and labels, for example.

SUMMARY

A user making changes in the context of a multi-user database application may face many uncertainties. The user may be unsure what has changed, what state a database/schema/application is in, how different kinds of changes interact with each other, and/or how the changes made by the user relate to concurrent changes made by other users, for example. In some cases, a user also contends with different user experience models for creating and saving different types of changes.

Some embodiments described herein help manage changes in a multi-user database application environment. One embodiment collects proposed changes to the multi-user database application environment prior to committing any of those changes. The proposed changes may include data changes, schema changes, and/or application changes. Preconditions and postconditions of proposed changes are identified, and used to analyze dependencies between proposed changes. The proposed changes are placed in order in a change list, according to their dependencies. After verifying that preconditions of each proposed change will be satisfied, the proposed changes are committed in order during a single transaction. If a proposed change precondition does not exist in the current state and will not be provided by proposed change(s) which precede that proposed change in the ordered change list, then an error is raised and presented to the user, and the proposed change is not committed. The commitment may return identifiers and other return values, in addition to indicating whether the commitment was successful.

With some embodiments, a user observes values of a multi-user database application environment. The user submits to an editor multiple proposed changes to at least some of the observed values. The proposed changes may involve two or three of the change categories, namely, data changes, schema changes, application changes, and the user may also specify foreign key and/or other relationships between items belonging to one or more of the categories. The user commands the editor to commit all of the proposed changes together, as opposed to trying to commit the changes one by one with intervening results and possible intervening activities by other users. The user receives a response to the "commit all changes" command which indicates whether any proposed change is inconsistent with another change made after the observing and submitting steps and before the commanding step. For example, a proposed change to a data value may be inconsistent with a change which removed a data element containing the data value, if the removal occurred after the observing and submitting steps and before the commanding step. Other inconsistencies may also be detected and reported.

Some embodiments include a diff manager that can produce diffgrams from user gestures; diffgrams represent proposed changes to observed data, schema, and/or application values. A user-specific change buffer maintains a collection of diffgrams for a specific user, and produces views of a multi-user database application environment which reflect the impact that proposed change diffgrams would have on the environment if committed. A query-update engine can access a shared multi-user store of data values, schema values, and application values. Value changes in each of these categories can be submitted to the shared multi-user store to be committed. Value changes may propose changes to relational values of a database and/or changes to graph objects of an application description, for example. Value changes may include a SQL statement in the context of an optimistic concurrency check or a check for consistency with a previous state. Results of the commitment attempt can be detected by the query-update engine and reported back to the user.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
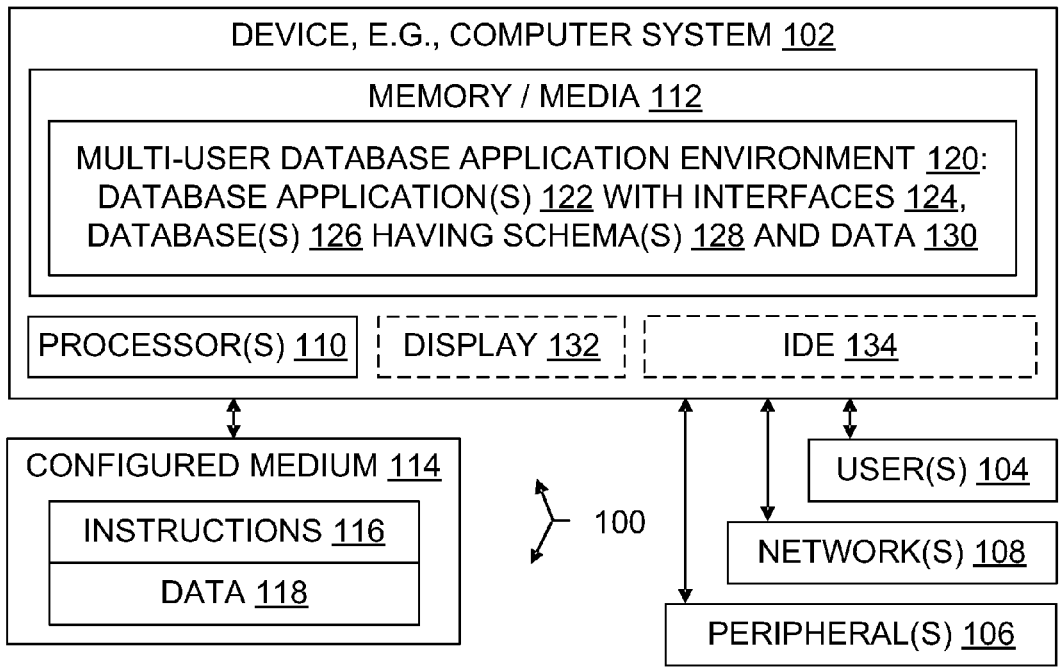
FIG. 1 is a block diagram illustrating a computer system having at least one processor, at least one memory, a multi-user database application environment, and other items in an operating environment which may be present on multiple network nodes, and also illustrating configured storage medium embodiments.

Many aspects of a multi-user database application could be changed, at least in theory, by the creators or users of the application. For clarity, these aspects can be categorized as data changes, schema changes, and application changes, but it will be appreciated that some changes cross these categories, and that other categories may be used in other discussions. Application changes involve changes to the description of a database application itself, such as pages, layout, and so on. Schema changes involve changes to the description of the data, such as a schema for tables, for example. Data changes involve changes in the data of the application's database, such as names, ages, and/or other data stored in tables accessed by the application.

Some embodiments described herein provide a unified optimistic concurrency editing model which manages application, schema, and data changes. Some embodiments present users with an editing experience in a unified user model and also implement the solution with a unified architecture.

Some embodiments use optimistic concurrency in an environment that allows concurrent data and schema changes. In some embodiments, a unified edit architecture supports all categories of changes in some embodiments, and a global save user model receives all three categories of change and submits them for transactional commitment.

A given embodiment may also include some of the following aspects. In some embodiments, a user interface displays changes and reports interaction with other users' changes. Summaries and status indications may be displayed. Conflicts may be detected and resolved, including for example schema-schema, schema-data, application-application, application-schema, and application-data conflicts. An optimistic concurrency approach may be defined over graph structured data. The approximate result of proposed changes may be seen by a user before those changes are actually applied. Changes may be ordered across categories before applying them, to reduce errors and preserve good state.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "change(s)" means "one or more changes" or equivalently "at least one change".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", "submitting to", "providing to", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by operations in a concurrent unified change management as discussed herein, e.g., by collecting, analyzing, ordering, committing, binding, deployment, execution, modification, display, creation, loading, and/or other operations.

A multi-user database application environment 120, including database application(s) 122 with interfaces 124, databases 126 with schemas 128 and data 130, other software, and other items shown in the Figures may reside partially or entirely within one or more media 112, thereby configuring those media. An operating environment may also include other hardware, such as display(s) 132, buses, power supplies, and accelerators, for instance.

A given operating environment 100 may include an Integrated Development Environment (IDE) 134 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use multi-user database application environments or components thereof.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
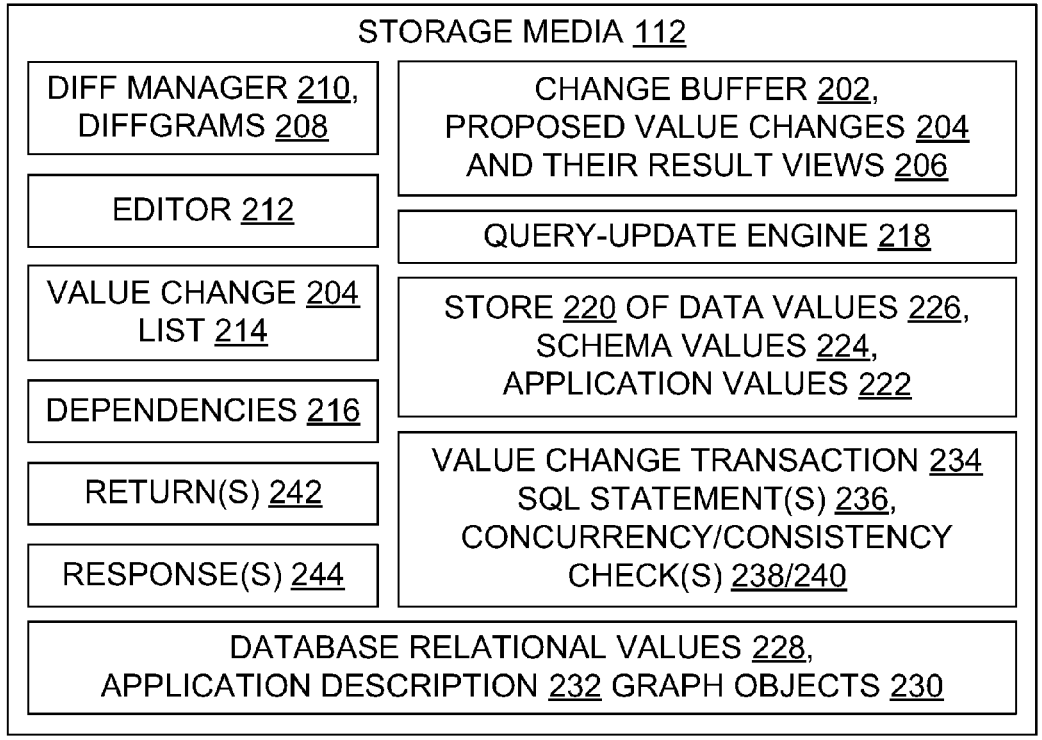
FIG. 2 is a block diagram illustrating aspects of an example architecture for managing unified concurrent changes to data, schema, and application values in the FIG. 1 operating environment.

FIG. 2 illustrates aspects of an architecture which is suitable for use with some embodiments. A change buffer 202 (sometime referred to as a local buffer in client-server embodiments) contains proposed change(s) 204 to application(s) 122, schema(s) 128, and/or data 130. The change buffer 202 may also contain views 206 depicting the approximate results of applying the proposed changes 204. Such a view 206 is approximate in that it is based on the state of the environment 120 at an earlier point in time and since that point in time other users may have not only proposed changes but also committed them.

Proposed changes 204 are represented in some embodiments as diffgrams 208, namely, data structures which represent a set of edits across change categories. Diffgrams may be implemented using trees, lists, bitflags, attributes, objects, classes, class methods, and/or other familiar data structures adapted to represent edits to applications 122, schemas 128, and/or data 130. In some embodiments, diffgrams are produced from user gestures input by a user 104 to a user interface of a diff manager 210.

More generally, an editor 212 accepts proposed changes 204 as user input and gives the proposed changes to a database management system and/or an application editing system for committal. In some embodiments, the editor places the proposed changes 204 in a list 214. In some cases, the list 214 is ordered according to dependencies 216 between the proposed changes, so that the order in which the changes are placed for committal is not necessarily the order in which changes were entered in the editor 212 by the user 104.

In some embodiments, the editor 212 includes the diff manager 210, the change buffer 202, and a query-update engine 218. In some, these three components of the editor 212 communicate with one another using diffgrams 208, so the architecture is unified with respect to internal representation of changes within the change lifecycle. In some embodiments, diffgrams can represent changes 204 of all three categories (application, schema, data), so the architecture is unified with respect to internal representation of changes involving two or more of the application 122, schema 128, and data 130.

In some embodiments, the query-update engine 218 can access a shared multi-user store 220 of application values 222 representing applications 122, schema values 224 representing schemas 128, and data values 226 representing data 130. In this regard, the architecture is unified with respect to representation of all three categories in a single shared store which is accessed by a single editor 212 that accepts proposed changes 204 in each of the three categories (application, schema, data). In some embodiments, changes 204 to a database 126 may include changes to database relational values 228, namely, relational database 126 schema 128 and/or data 130 values. In some embodiments, changes 204 to an application 122 may include changes to graph objects 230 in an application description 232.

In some embodiments, collected proposed changes 204 are placed for commitment together in a single value change transaction 234. Such a transaction may include proposed changes 204 in one, two, or all three of the change categories (application, schema, data), depending on the user's desires and the embodiment's support for unified changes. Some embodiments implement at least some changes for committal as SQL statements 236. In some cases, in some embodiments, the SQL statements may occur in the context of one or more optimistic concurrency checks 238 and/or checks 240 for consistency with previously observed values. The commitment operation provides returns 242, which in some embodiments may include identifiers generated by a database management system, as well as success/failure/error-code returns. The editor 212 then provides corresponding responses 244 to the user 104 through error reports, success messages, and the like. In some embodiments, commitment involves discarding successfully-committed diffgrams and also resynchronizing cached values to get the current state of post-committed, cached values.

Figure 3:
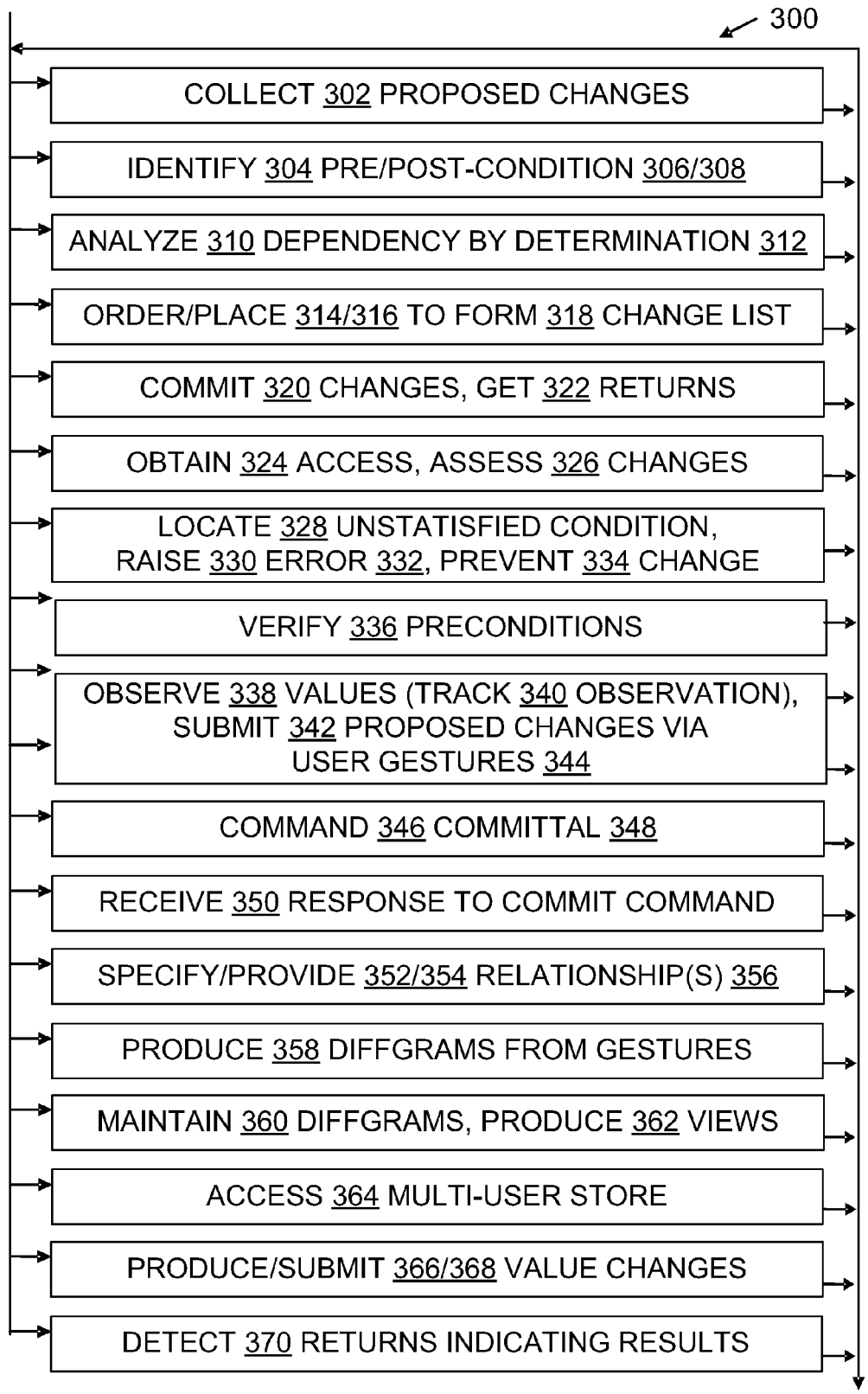
FIG. 3 is a flow chart illustrating steps of some process and configured storage medium embodiments.

With reference to FIGS. 1 through 3, some embodiments provide a computer system 102 with a logical processor 110 and a memory medium 112 configured by circuitry, firmware, and/or software and located in at least one machine to transform user gestures and an existing environment 120 by unified concurrent changes to data, schema, and application as described herein. In some embodiments a diff manager 210 residing in the memory is operable to produce diffgrams 208 from user gestures. A user-specific change buffer 202 residing in the memory is operable to maintain a collection of diffgrams 208 for a specific user 104 and to produce for the specific user 104 views 206 of a multi-user database application environment 120 which reflect the impact that zero or more diffgrams 208 would have on the environment if committed. A query-update engine 218 residing in the memory is operable to (a) access a shared multi-user store 220 of values in each of the following categories: data values, schema values, application values, (b) submit value changes 204 in each of these categories to the shared multi-user store, and (c) detect results after an attempt to commit changes in these categories to the shared multi-user store.

In some embodiments, an architecture supports implementations in which all these components 202, 210, 218 are implemented within a single client executable. Some embodiments also support web-based implementations in which the query-update engine 218 is implemented in a middle tier, and the other two components 210, 202 are implemented in a web browser.

Some embodiments include a value change 204 residing in the memory, with the value change including a SQL statement 236 in a context provided by a check. For example, the context may include an optimistic concurrency check 238 to see whether values involved in the particular user's proposed value change have been altered by another user since they were last observed by the present user. The SQL statement context may also or alternately include a consistency check 240 for consistency of the proposed value with a previous state of that value. Optimistic concurrency checks generally include consistency check, but may also check other values. For example, when changing a data value, a consistency check may compare the new (proposed) data value with the last observed value. A concurrency check may do that, and also check for changes in the schema that could impact the data value.

In some embodiments, a SQL UPDATE statement 236 is not guarded by an optimistic concurrency check 238 but is subject to a consistency check 240, in that the set that the UPDATE is applied to is restricted by preconditions stating the previous state of the rows that are about to be updated. After the update, the embodiment counts the rows that have been affected and compare that with the expected number of rows that should have been affected. If the numbers are not equal then the embodiment raises a concurrency error and rolls back the whole transaction.

In some embodiments, the query-update engine 218 is operable to order proposed value changes based on dependencies between proposed value changes. Some embodiments include a value change list 214 residing in the memory. The list 214 contains proposed value changes of one or more (in some cases all three) change category (data, schema, application); the changes are listed in a commitment order suitable for commitment under a single transaction. In some cases the single transaction updates a single store on one machine, for example, while in other cases the transaction may be distributed across multiple stores and/or multiple machines.

In some embodiments, an application processor or other component of the system is operable to track which values are queried by the user 104 during a period of operation of a multi-user database application 122. The query-update engine 218 is operable to produce value changes 204 which are conditional in that they request commitment only after verifying that the values queried by the user have not changed, that is, after a consistency check 240.

In some embodiments, the query-update engine is operable to produce value changes 204 for relational values 228 of a database 126, and such changes reside in the system. In some embodiments, the query-update engine is operable to produce value changes 204 for graph objects 230 of an application description 232. In these examples, the relational values 228, the database 126, the graph objects 230, and the application description 232 may each be provided by familiar technology.

In some embodiments, the system includes a single transaction 234 containing a value change 204 for a value of a database 126, a value change 204 for a value of a database schema 128 of the database, and a value change 204 for an application description 232 of an application 122 for accessing the database. Each of these value changes may have the same user 104 as an author.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

FIG. 3 illustrates some process embodiments in a flowchart 300. Processes shown in the Figures may be performed in some embodiments automatically, e.g., by a testing script requiring little or no contemporaneous live user input to exercise an editor 212 which in turn submits value changes 204 in multiple change categories. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a collecting step 302, an embodiment collects proposed value changes 204. Step 302 may be accomplished using user interfaces adapted to receive gestures seeking changes to data, schema, and/or application values, or other mechanisms, for example. Collection 302 of proposed changes may interleave observations (via interrogations, for instance) of current values with submission of proposed changes to an editor by a user. In some embodiments, the query-update engine serves as or contains an application processor or other component which intercepts queries and tracks observation of values by the user, before forwarding the queries.

In some embodiments, a user's observations need not be entirely self-consistent. For example, a user A might observe data for the first ten employees in an employee database, sorted alphabetically by Surname. Based on that information A may update some of the data. Meanwhile, user B makes numerous edits, not only to the first group of ten employees but also to the following (second) group of ten employees, and commits the edits. User A then pages down to observe the second group of ten employees. Some embodiments do not refresh user A's observation of the first ten employee values, and others do. In short, A's view of the database may not be entirely consistent in every way. However, unacceptable inconsistencies will eventually be found, when A attempts to commit changes.

During an identifying step 304, an embodiment identifies preconditions 306 and/or postconditions 308 of collected proposed value changes. Step 304 may be accomplished using special-purpose code and/or circuits embodying logical analysis of changes. Before entering a data value in a row or specifying a display format for the data value, for example, the row should be created if it does not already exist. Other examples are also provided herein, but the examples are not intended to be comprehensive; they merely provide guidance that one of skill may expand upon.

During a dependency analyzing step 310, an embodiment analyzes proposed changes 204 for dependencies. Analysis may include determining 312 the impact of postconditions and preconditions. For example, analysis 310 may determine that a postcondition of one proposed change interferes with a precondition of another proposed change, as when renaming a row (e.g., from "Bob" to "Robert") interferes with changing a data value in the row (e.g., Bob's postal address) or displaying the row's contents. As another example, analysis 310 may determine that a postcondition of one proposed change facilitates a precondition of another proposed change, as when adding a table facilitates adding data values to the table and printing the table in a report. Step 310 may be accomplished using special-purpose code and/or circuits embodying determination and analysis of change dependencies.

During a proposed change ordering step 314, which includes one or more change placing steps 316, an embodiment places changes proposed by a user 104 to form 318 a change list 214. The change list is not necessarily in commitment order at every point in time, but will be placed in commitment order prior to being submitted for commitment in a single transaction 234. Changes may be ordered 314, for example, based on postconditions and preconditions so that preconditions are satisfied, or at least not violated, by postconditions of change(s) placed earlier in the list 214. Linked list, tree, and other familiar data structures may be used in implementing the change list 214 and steps 314, 316, adapted to the particulars of proposed changes and change lists 214 as taught herein.

Some embodiments don't order buffered 202 update diffgrams, but order them later instead, e.g., in a query-update engine just prior to commitment. An editor user interface may enforce some ordering. For instance, if a user wants to set Order.CustomerName to a customer that doesn't exist yet, then the user is not offered that CustomerName in a dropdown list. Users may be prominently notified that they are operating against a buffered, prospective database. Some embodiments do not necessarily take advantage of any order that might be offered by the user when ordering 314 diffgrams for generating a T-SQL statement to commit 320 changes.

During a change committing step 320, an embodiment attempt to commit (or equivalently, instructs a DBMS and/or other software to attempt to commit) an ordered list 214 of proposed changes 204 to data, schema, and/or application values. Familiar interfaces to familiar DBMS and other value maintenance technologies may be used, for instance, during step 320.

During a return getting step 322, an embodiment gets returns 242 from committing step 320. Returns may include success codes and/or error codes, for example. In some embodiments, returns 242 may also include identifiers generated by a database management system or store, e.g., when tables or other schema elements are created, or when rows are added. Familiar interfaces to familiar DBMS and other value maintenance technologies may be used, for instance, during step 320.

During an access obtaining step 324, an embodiment obtains exclusive access to part of a multi-user database application environment 120, such as by obtaining a lock using familiar technologies.

During a change assessing step 326, an embodiment assesses changes of a proposed change list 214 with regard to satisfaction of preconditions. Step 326 may involve analyzing step 310 in the context of exclusive access obtained 324 by an embodiment, for example.

During an unsatisfied condition locating step 328, which may occur during change assessing step 326, for example, an embodiment locates a proposed change whose precondition(s) are unsatisfied. The embodiment may raise 330 an error 332 reporting to the user 104 the existence, and perhaps the nature, of the unsatisfied condition. Some embodiments also prevent 334 the proposed change from being committed.

During a precondition verifying step 336, an embodiment verifies, perhaps with locking assumed, that precondition(s) of each proposed change in a change list 214 will be satisfied as of the time the change is to be committed. Step 336 may include assessing step 326 in the case where all preconditions are satisfied, for example.

During a value observing step 338, a user of an embodiment observes value(s) pertaining to the data 130, schema 128, and/or application 122 aspects of an environment 120. For example, the user may interrogate a database 126, load into a schema editor a schema 128 or a portion thereof, or load into an application description 232 editor an application description or a portion thereof.

During an observation tracking step 340, an embodiment tracks user activity during value observing step 338. Step 340 may be accomplished using user interface shims, logging, and/or other familiar tracking mechanisms, adapted to track particular items such as those denoted herein at 122, 126, 128, 130, 228, 230, and/or 232, for example.

During a user-controlled submitting step 342, a user of an embodiment submits proposed changes 204 to the embodiment, e.g., by making user gestures 344 in a user interface of an editor 212.

During a committal commanding step 346, a user of an embodiment commands the embodiment to attempt to commit a collection of proposed changes 204, within a single transaction, and to report back the results of the attempt. For example, an editor 212 used by the user may have a "global save" button which operates to initiate the committal commanding step 346 when clicked by the user.

During a response receiving step 350, a user of an embodiment receives a response 244 to the committal commanding step 346. Responses may be provided using familiar user interface mechanisms, error codes, and success indicators, adapted to the optimistic concurrency utilized in some embodiments, for example.

During a relationship specifying step 352, a user of an embodiment specifies relationship(s) 356 between data 130, schema 128, and/or application 122 items that are involved in proposed changes 204. For instance, a user 104 may specify that all names displayed on a given page are employee names. Familiar user interface mechanisms, adapted for the unified treatment of data 130, schema 128, and application 122 items within an editor 212 may be used, for example, but relationships may also be specified using familiar software tools instead of an editor 212.

During a relationship providing step 354, a user of an embodiment provides to an editor 212 one or more relationships 356 between data 130, schema 128, and/or application 122 items that are involved in proposed changes 204. Step 354 may be accomplished by specifying step 352 if the user specifies the relationship(s) directly in the editor 212, for example. Alternately, if the user specifies 352 the relationship(s) elsewhere, e.g., using familiar software, then the relationship(s) may be provided 354 by importing to the editor 212 a file or collection of files created during that specification 352.

In some embodiments, some or all such relationships are inferred in the course of processing an application description 232. For instance, if an application description instructs an embodiment to query over a table Customers for columns Name and Age for employees Bob and Fred, the embodiment notes the user has observed a particular relationship in the application description and schema values for table Customers, columns Name and Age, and data values Bob and Fred.

During a diffgram producing step 358, an embodiment produces diffgram(s) 208 from user gesture(s) 344. Familiar user interface software adapted for unified receipt of gestures controlling data 130, schema 128, and/or application 122 items may be used, for example, together with a diffgram 208 data structure which captures state proposed changes to such items.

During a diffgram maintaining step 360, an embodiment maintains a collection of diffgram(s) 208 corresponding to a set of proposed changes 204 which have not yet been submitted for committal 348. Step 360 may include steps such as ordering 314 proposed changes which are represented by diffgrams, placing 316 such proposed changes in a list 214, analyzing 310 proposed change dependencies, assessing 326 proposed changes, and/or tracking 340 user observation of data 130, schema 128, and/or application 122 items.

During a view producing step 362, and embodiment produces for a user view(s) 206 reflecting the state of the environment 120 if the proposed changes represented by one or more diffgrams were successfully committed 320. Familiar user interface tools such as HTML, Windows Presentation Foundation, and others, for creating/configuring visual displays 132 can be used, adapted to base the view(s) on the as-yet uncommitted changes 204 in conjunction with the underlying store 220.

During a store accessing step 364, an embodiment accesses a multi-user store 220, e.g., by using familiar tools to read and/or write the store, under direction of an editor 212 and/or a query-update engine 218, for example.

During a conditional value change producing step 366, an embodiment produces conditional value changes 204, namely, changes which are conditioned upon optimistic concurrency check(s) 238 and/or prior value consistency check(s) 240. Step 366 may be accomplished, for example, using SQL statements 236 in the context of conditional SQL control flow statements based on the check(s) 238, 240 to be performed during a transaction 234. Conditions for check(s) 238, 240 may be generated automatically based on analysis 310 and/or assessment 326, for example, and/or as conditions that are provided explicitly by a user 104.

During a submitting step 368, an embodiment submits conditional value changes 204 for committal 348, e.g., in response to a command 346 to commit a collection of proposed changes.

During a return detecting step 370, an embodiment detects return(s) 242 from a committal attempt. Returns may include success/error indicators, for example, and may include identifiers provided by the database and/or by other software.

The foregoing steps and their interrelationships are discussed in greater detail below, in connection with various embodiments.

Some embodiments provide a process for managing changes in a multi-user database application environment. The process is described at first below primarily as seen from an implementation's point of view, but it will be appreciated that corresponding processes from a user's point of view are also described and implicitly/explicitly taught herein.

In some embodiments, a process includes collecting 302 proposed changes to the multi-user database application environment prior to committing any of those changes. The process identifies 304 for a particular proposed change Y at least one precondition PreY presumed by Y and at least one postcondition PostY to be caused by committing Y, and identifies 304 for a particular proposed change X at least one precondition PreX presumed by X and at least one postcondition PostX to be caused by committing X. To analyze 310 a dependency of change X and change Y, the process determines 312 that PostY renders PreX unavailable (i.e., a result of change Y violates a precondition for change X, so Y cannot be committed before X) and/or determines 312 that that PostX allows PreY (i.e., a result of change X does not rule out change Y, so X can be committed before Y). Then the process orders 314 the proposed changes to form an ordered change list 214 with change X preceding change Y in order of commitment in the list.

The foregoing embodiments involve collecting 302 proposed changes 204 and ordering 314 them before trying to commit 320 them. These embodiments do not necessarily rule in or rule out other aspects discussed herein, such as optimistic concurrency, transactional commitment, or a unified user experience for data, schema, and application changes.

As a detailed example, in some embodiments the ordering step 314 places 316 in the ordered change list a proposed schema change 204 that would create a database element prior to a proposed data change 204 that would write a value in that database element. For instance, the changes might attempt to create an Age column in an Employees table, and then add a row to the Employees table, with the row including an Age value.

As another detailed example, in some embodiments the ordering step 314 places 316 in the ordered change list a proposed change 204 that would reference a database element value prior to a proposed change 204 that would remove that database element. For instance, the changes might attempt to change Tasks.AssignedTo from Bob to Fred before deleting Bob's row. Another example is changes that attempt to copy something from Bob's row in Employees table before deleting Bob's row.

In some embodiments, the process commits 320 a collection of changes in a transaction. For instance, the process might commit 320 both change X and change Y noted above in a single transaction 234. These embodiments add transactional commitment to aspects noted above (collecting changes and ordering them). These embodiments allow but do not require optimistic concurrency, and a unified user experience for changes to data, schema, and applications.

In some embodiments, the process obtains 324 exclusive access to a portion of the multi-user database application environment. The portion in question has some current state when the exclusive access is obtained. The process assesses 326 for each proposed change 204 whether all preconditions for that proposed change either exist in the current state or will be caused by proposed change(s) which precede that proposed change in the ordered change list.

Such embodiments add an aspect of optimistic concurrency to the aspects of collecting and ordering changes. In response to a Save button, for example, some such embodiments lock whatever (data, schema, application description) may be changed, thus obtaining 324 exclusive access. Then these embodiments check to see what has changed while the user collected proposed changes to submit, that is, the process assesses 326 the proposed changes relative to the values the user first saw. Two kinds of preconditions may be involved, namely what was in the environment 120 when the client first observed it, and what will come about as a result of the ordered changes. In some embodiments, if all preconditions are satisfied, the process then commits 320 the proposed changes. However, in some embodiments and some situations, a user 104 may have an embodiment perform these obtaining 324 and assessing 326 steps in the background while editing the proposed changes, without actually committing 320 changes until the user is ready and explicitly commands 346 the embodiment to commit the changes.

In some embodiments, the assessing step locates 328 a proposed change having a precondition which does not exist in the current state and will not be caused by proposed change(s) which precede that proposed change in the ordered change list. In this event, the process raises 330 an error and prevents 334 the proposed change from being committed, e.g., by removing it from a transaction. This activity recognizes that optimistic concurrency is too optimistic in some situations, in that conflicting changes can be made by other users.

In some embodiments, the collecting step 302 collects proposed changes 204 in at least two of the following change categories: data changes, schema changes, application changes. In some, proposed changes 204 are collected in all three categories. In this regard, some embodiments provide a form of unified user experience across change categories. In some embodiments, distinctions between change categories are sharp, in that a given change may impact only a single category. In other embodiments, such distinctions are blurred, in that changes may involve two or even three of the categories. Formal relationships may exist between the categories, but are not required in every embodiment.

In some embodiments, application descriptions 232 are stored in the same database as data values and schema values, to facilitate transactional commitment of changes in all three categories, or in any two categories that include application change. In other embodiments, application descriptions are stored separately, and transaction commitment is accomplished with familiar distributed transaction technology, e.g., by locking an application description portion of the overall store 220, locking a schema-data portion of the overall store 220, committing the application change(s), committing the schema and/or data changes, unlocking the application description portion of the overall store 220, and unlocking the schema-data portion of the overall store 220.

In some embodiments, the process orders 314 at least three proposed changes in order of commitment based on at least two analyzed dependencies, the proposed changes being in at least two of the following change categories: data changes, schema changes, application changes. The process verifies 336 that precondition(s) of each proposed change will be satisfied at a commitment time of the proposed change. Then the process commits 320 the proposed changes in order of commitment in a single transaction during which any change that would conflict with the proposed changes is barred. Some embodiments thus include the aspects of collecting changes, ordering them before trying to commit them, optimistic concurrency (e.g., verifying 336 preconditions), transactional commitment 320 ("single transaction"), and a unified user experience for data, schema, and application changes ("at least two change categories").

As suggested above, the transaction may be a single transaction even if multiple locks in multiple databases or other store portions are involved. By using multiple locks when separate databases are involved, the characteristics of a transaction may nonetheless be provided. For example, a process may exercise exclusive write control of the store (regardless of how many databases constitute the store 220), may be able to rollback changes, and so on.

In some embodiments, the process gets no return value from the committing step. In other embodiments, the process gets 322 at least one return 242 value from the committing step. Returns can be status codes and/or identifiers. The term "identifiers" is used broadly herein with regard to returns 242, and may include database generated IDs or modified values returned from a commitment operation. For instance, when inserting a new customer, the ID of the customer can be auto generated by the DBMS. The newly auto generated ID is retrieved and returned back once the transaction has completed successfully. However, return 242 "identifiers" are not limited to keys or other single values; they can also be any database auto-generated or modified cells.

Turning now to the user's point of view, some embodiments provide a process for making changes in a multi-user database application environment 120 which includes a particular user of the environment observing 338 values of the multi-user database application environment and submitting 342 to an editor multiple proposed changes to at least some observed values of the multi-user database application environment. The proposed changes may be one or more change categories, namely, data changes, schema changes, application changes. The user also commands 346 the editor to commit 320 all of the proposed changes together, as opposed to commanding the editor to commit one of the changes, receiving a response to that command, then commanding the editor to commit another of the changes, receiving a response to that command, and continuing to commit the changes one by one.

It will be appreciated that the submission of proposed changes is not necessarily best viewed as a discrete user action, but rather as a series of user actions. A user makes one or more observations of some of the data in the database, for example, collects a set of proposed changes relative to these observed values, and then asks that the proposed changes be atomically committed. The observing and collecting actions can be interleaved, and some embodiments protect against any external changes that may occur during this portion of the process, in addition to protecting against changes by other users that occur after all the proposed changes have been collected and an attempt to commit them is made.

In some embodiments, the process involves receiving 350 a response to the commanding step which indicates that a proposed change 204 is inconsistent with another change that was made after the observing and submitting steps and before the commanding step. For example, a SQL transaction 234 may fail with a consistency error because another user changed something (data, schema, and/or application description) between the time this user submitted a proposed change and the time this user commanded 346 that the proposed change(s) be committed.

As a detailed example, some embodiments receive 350 a response 244 to the commanding step which indicates that a proposed change to a data value is inconsistent with a change which removed a data element containing the data value, made after the observing and submitting steps and before the commanding step. For instance, perhaps client B wants to change Bob's age but client A has removed Bob's row from an Employees table.

As another detailed example, some embodiments receive 350 a response 244 to the commanding step which indicates that a proposed change to change a data value is inconsistent with a change which (a) removed a database element containing the data value and (b) was made after the observing and submitting steps and before the commanding step. For instance, client B wants to change Bob's age but client A has removed an Age column from an Employees table.

As another detailed example, some embodiments receive 350 a response 244 to the commanding step which indicates that a proposed change to change a data element type is inconsistent with a change which (a) renamed the data element and (b) was made after the observing and submitting steps and before the commanding step. For instance, client B wants to change Bob's age type but client A has renamed Bob's row to "Robert".

As another detailed example, some embodiments receive 350 a response 244 to the commanding step which indicates that a proposed change to change a database element type is inconsistent with a change which (a) renamed the database element and (b) was made after the observing and submitting steps and before the commanding step. For instance, client B wants to change an Age column type but client A has renamed the Age column.

As another detailed example, some embodiments receive 350 a response 244 to the commanding step which indicates that a proposed change to change an application display rule for a data element is inconsistent with a change which (a) removed a database element and (b) was made after the observing and submitting steps and before the commanding step. For instance, client B wants to change how Age column values (data elements) are displayed in the application 122 but client A has removed the Age column (database element) from the schema.

As another detailed example, some embodiments receive 350 a response 244 to the commanding step which indicates that a proposed change to change an application display rule for a data element is inconsistent with a change which (a) renamed a database element and (b) was made after the observing and submitting steps and before the commanding step. For instance, client B wants to change how Age column values are displayed in the application but client A has renamed the Age column.

Many other inconsistency scenarios are also possible. For example, client A wants to change the type of column Age from string to int and client B wants to change Bob's age from "32" (a string) to "34" (also a string). The examples of inconsistency scenarios and the example checks provided herein are not comprehensive of all possibilities in all embodiments.

More generally, some embodiments receive 350 from the editor 212 a response indicating that an uncommitted proposed change 204 is inconsistent with a committed change submitted by another user of the environment. Users may be shown details after a SQL transaction fails with a consistency error, for example. An implementation may report specifically why the transaction failed, and may indicate what other users could be contacted about it because their changes are also involved.

Some embodiments include specifying 352 at least one relationship between items belonging to one or more of the following categories: data values, schema values, application values, and also include providing 354 the relationship(s) during the submitting step. For instance, some embodiments allow a user 104 to create relationships between different data values, schema values or application values in memory. Such relationships may be based on a temporary in-memory structure, because keys used to signify the existence of such relationships may be auto-generated by the database at commit time. As part of committing the changes, some embodiments attempt to ensure that more permanent relationships are created between these entities. For example, when inserting a new Customer (c1) and a New Order (o1) for that particular Customer (c1), o1 gets linked to c1 in memory. However, if the Primary Key of c1 is a database generated value, a more permanent relationship is made between o1 and c1 after c1 is actually inserted and the auto-generated Primary Key value of c1 is retrieved as a return 242 value. Once that return value is retrieved an embodiment can automatically update the CustomerId column of o1 to the more permanent value of c1's primary key so that o1 is correctly linked to c1. Some embodiments use results returned from commit (store-generated values) to update the values cached in a change buffer. Other embodiments discard all cached values of the change buffer after a successful commit and requery to repopulate the change buffer with values sufficient to support the application's current page, for example.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as diffgrams 208, ordered change lists 214, proposed changes 204 in all three categories, and/or editors 212 with a global save command 346, in the form of data 118 and instructions 116, read from a removable medium 114 and/or another source such as a network connection, to form a configured medium. The configured medium 112 is capable of causing a computer system to perform process steps for transforming data through aspects such as optimistic concurrency, ordered changes, unified architecture and user experience across change categories, and other aspects disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Figure 4:
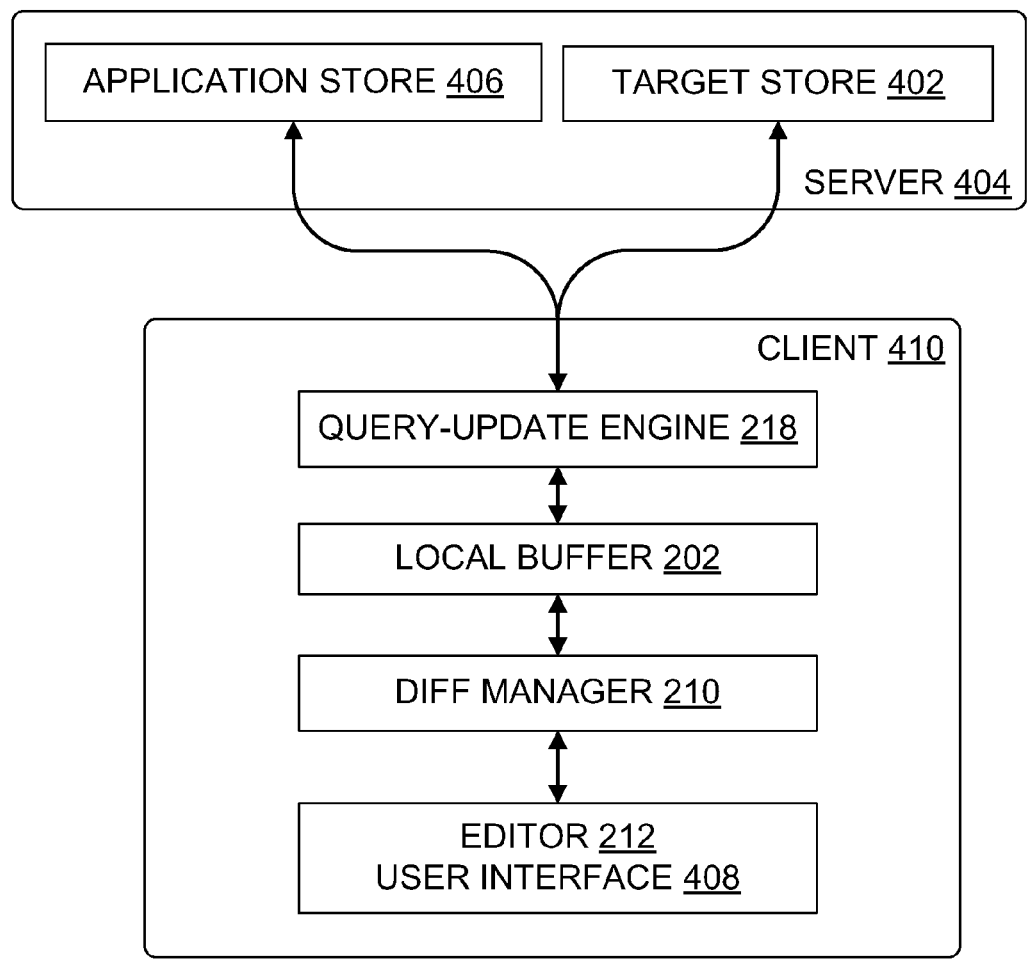
FIG. 4 is a block diagram illustrating an example architecture which includes a diff manager, query-update engine, and other items in a client-server operating environment.

In some embodiments, including some illustrated in FIG. 4, an architecture includes three major subsystems: a query-update engine 218, a local buffer 202, and a diff manager 210. These three components communicate using diffgrams 208. A diffgram is a concrete representation of a set of edits to an item of data 118. Within the diffgram, data to be changed has an identity. Identities are manipulated generically. For a given piece of data 118, the identity is sufficient to map the data back to storage, so the form of the identity depends on the source of the data 118. In particular, target data of a database 126 may well be stored relationally in a target store 402 on one or more servers 404, while application descriptions 232 include graph structured objects 230 stored in an object repository which serves as an application store 406. The stores 402, 406 collectively form the multi-user store 220 in this example. The form of the identity differs between these forms of data 118.

In some embodiments, the query-update engine 218 is responsible for accessing 364 stored data 118 of all sorts (application descriptions 232, schemas 128, and target data 130), submitting 368 changes of this data to storage, and detecting 370 and interpreting failures of these changes. One role of the query-update engine 218 is the creation and interpretation of identities (a.k.a., "identifiers") in terms that are understood by stores 220. When queries are made of storage, an embodiment may generate identities for returned 242 data. When updates are made an embodiment may translate a set of diffgrams 208 into a sequence of operations to be applied to the store(s) 220, which may involve reordering 314 changes to accommodate semantic constraints imposed by the store.

In embodiments which support optimistic concurrency, the store 220 may have been changed in ways in conflict with a given user's update while the embodiment and/or the user were preparing the update. In some embodiments it is a responsibility of the query-update engine 218 to detect these situations, with the help of the underlying store, and to report them in an actionable response 244. This responsibility may rely on knowledge of the semantics of the underlying data, and may be tightly coupled to the store 220. For example, relational data and graph object data have different conflict detection rules. Some embodiments are also designed to handle the possibility that changes will conflict between data store updates. To support the detection of such conflicts, some diffgrams 208 include both the old value that was obtained from the store, and the new proposed value.

In some embodiments, the local buffer 202 maintains 360 a collection of diffgrams 208, and produces 362 for display to the user a view 206 of data 118 representative of what the state would be if the currently accumulated uncommitted changes 204 were successfully committed 320 out to storage. This is the view of data seen and manipulated by the user, in some embodiments. In addition to storing the original value of data 118, and the current proposed value, this component may also present the current database 126 and application description 232 values, to facilitate presentation of conflicts.

In some embodiments, when a user chooses to commit their changes 204, all changes are packaged up and submitted as a single update to the query-update engine 218. The submission 368 may complete successfully, or it may fail. In the failure case, some embodiments receive enough information about the current state of storage to allow them to build a presentation of conflicts. In some embodiments, a user's gestures to resolve conflicts are reflected in the user interface prior to another transaction invocation, in order to give visual feedback that the state of the system has changed.

In some embodiments, the diff manager 210 is responsible for translating user gestures 344 into diffgrams 208. When queries are evaluated by the query-update engine 218, they are annotated so that the identities of individual results are available. The diff manager 210 uses these identities to create the diffgram for a particular user gesture received, e.g., through an editor 212 user interface 408. A given user gesture may result in the creation of many diffgrams, in some embodiments.

In some embodiments, several components 218, 202, 210, 212 are implemented within a single executable resident on a client 410. Some embodiments include web implementations in which the query-update engine 218 is implemented in a middle tier, and components 202, 210, 212 are implemented in a browser.

As to the user model, in some embodiments the user model is such that all types of changes—application, schema, and data—share a unified overarching experience. An example of that is the experience of global save; different types of changes can be made and then when the user hits the save button as a command 346, and then all changes are applied at once. This approach allows the user to navigate all over the environment 120, making disparate types of changes, and then deciding to save at the user's leisure. This helps avoid situations imposed by approaches that force the user to save through different experiences for different types of changes, and do not let users make separate types of changes before saving. The user model discussed here gives significantly more flexibility and simplicity in terms of a single concept of "saving" changes.

In some embodiments, all categories of changes are also collected and logged such that the user can review all changes in a unified location. There a user can tell what has changed, been added, been removed, and so on, to help keep track of the activity that has yet to be saved. When the user saves using the global save button, they are shown and can reason over all configurations of conflicts such that they can make decisions on a resolution option for various in-data-source conflicts and cross-data-source conflicts. This provides greater flexibility than approaches that do not allow users to see directly how their schema changes, for instance, affect their data. Moreover, it may allow users to choose their conflict resolution option, instead of having their changes outright denied, or overwriting other users' changes.

More generally, some embodiments provide ordering of changes. The editor 212 collects and buffers numerous changes (to data, to schema, to the application description). These changes aren't committed to the database until the client hits "Save". An update engine orders these changes in such a way that they can be committed to the database (under a single transaction) and succeed.

Some embodiments provide optimistic concurrency. A given user may make data, schema, and application description changes in a single Open ... Edit ... Save encounter. The user authors these changes based on first querying the database to observe the current state of the data, schema, and application description. To ensure that their updates don't break the application, an embodiment may make sure that the database and/or other involved store 220 hasn't changed between the time the user first observed the values and the time they hit "Save" to commit 320 their various changes. Some embodiments keep track of what data/schema/application description the engine 218 queried for in the process of running the editor 212. At commit time, the editor 212 develops T-SQL update statements that reflect their proposed data/schema/application description changes 204. The T-SQL statements are conditional, verifying 336 that observed values for data/schema/application description remain unchanged by the time the changes are committed.

As a detailed example involving schema and data changes, through the editor a user creates a new column "Age" in an "Employees" table. Then the user adds a new row in the Employees table, and supplies a value for the "Age" cell in this new row. The "Age" column doesn't yet exist in the database, as these changes are buffered in the editor 212, so that they may be applied en mass to the database when the user hits "Save". The user hits "Save". For the SQL transaction for these changes to succeed, they are ordered. First, create "Age" column in "Employees" table. Second, add a new row to "Employees" (which includes an "Age" value).

As a detailed example involving data changes, assume Bob was just fired, and he needs to be deleted from the Human Resources database. A user deletes the row with primary key "Bob" from the Employees table. The user goes to a Tasks table and reassigns Bob's tasks to his replacement, "Fred". Suppose the Tasks table has a foreign-key constraint stating that the AssignedTo column in the Tasks table must match the EmployeeName field of some employee in the Employees table. For a "Fix some bugs" task in the Tasks table, the user updates the "AssignedTo" field from "Bob" to "Fred". The user hits "Save". For the SQL transaction for these changes to succeed, they are ordered 314. First, change Tasks.AssignedTo from Bob to Fred for the "Fix some bugs" task. Second, delete the "Bob" row in the Employees table.

As a detailed example involving optimistic consistency and data changes, suppose user A wants to remove Bob from the Employees table, since he was fired, and user B wants to change Bob's age in the Employees table from 42 to 43. In the editor 212, user B changes the "Age" field for the "Bob" row in the "Employees" table from 42 to 43. User B does not hit Save, but instead turns to other matters for awhile. To make the change from 42 to 43, the editor queried the database for Bob's age. As part of buffering the changes (pre-"Save"), the editor made note that it last observed Bob's age as being 42 (Database="HR", Table="Employees", Row="Name:Bob", Field="Age:42"). While user B is focused on other matters, user A deletes the "Bob" row from the Employees table, and saves this change to the database. User B returns attention to the editor, deliberates on the change from 42 to 43, and then hits Save. The SQL transaction fails, with a consistency error. The SQL statement for the 42-43 change guards the UPDATE with an optimistic concurrency check: delete from Employees where Name='Bob' and Age=43; if @@ROWCOUNT< >1 raiserror('CONCURRENCY ERROR', 1, 16);

As a detailed example involving optimistic consistency and schema changes, suppose user A wants to change the name of the "Age" column in the "Employees" table to "EmployeeAge". User B wants to change the type of the "Age" column from "nvarchar" to "int". In the editor, user B changes the type of the "Age" column, but does not hit "Save" immediately. Instead, user B does some related work in the HR database. To make this type change, the editor queried over SQL schema tables. As part of buffering the changes (pre-"Save"), the editor made note that it last observed an "Age" column of type "nvarchar" in the "Employees" table. Meanwhile, user A renames the "Age" column to "EmployeeAge" and saves this change to the database. User B decides that it's time, and hits Save with the intent of saving the "nvarchar"→"int" change along with the other HR database work. The SQL transaction fails, with a consistency error. The SQL statement for the "nvarchar"→"int" change guards the UPDATE with an optimistic concurrency check.

As a detailed example involving optimistic consistency and application changes, suppose user A wants to add a rule to an application 122 that says, "when displaying Age values, render those >55 in red". User B is deletes the Age column from the Employees table entirely. Through the editor 212, user A edits the application description to include the new rule, and refreshes the application to see that the rule has the desired effect. The application description is stored in the HR database. The user hasn't yet hit Save. To run the HR application, the editor processed the application description. In doing so, it made note of the fact that the application description required SQL queries over the Employees table. As part of processing the new Age-related rule in application description, the editor also made note of the fact that the rule pertains to the Age column in the Employees table. Meanwhile, user A deletes the Age column from the Employees table and saves this change to the database. User B then hits Save, with the intent of saving the revised application description with the added feature of Age value coloring. The SQL transaction fails, with a consistency error. The SQL statement that would update the application description includes an optimistic concurrency guard.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for managing changes in a multi-user database application environment, the process comprising the steps of:
    collecting proposed changes to the multi-user database application environment prior to committing any of those changes;
    identifying for a particular proposed change Y at least one precondition PreY presumed by Y and at least one postcondition PostY to be caused by committing Y;
    identifying for a particular proposed change X at least one precondition PreX presumed by X and at least one postcondition PostX to be caused by committing X;
    analyzing a dependency of change X and change Y by doing at least one of the following:
        determining that PostY renders PreX unavailable,
        determining that PostX allows PreY;
    and then
    ordering the proposed changes to form an ordered change list with change X preceding change Y in order of commitment in the list;
    committing both change X and change Y in a single transaction, instead of committing change X in one transaction and committing change Y in a different transaction;
    ordering a total of at least three proposed changes in order of commitment based on a total of at least two analyzed dependencies, these proposed changes being in at least two of the following change categories: data changes, schema changes, application changes;
    verifying that precondition(s) of each of these proposed changes will be satisfied at a commitment time of that proposed change; and
    committing these proposed changes in order of commitment in a single transaction during which any change that would conflict with these proposed changes is barred.

2. The configured medium of claim 1, wherein the ordering step performs at least one of the following:
    places in the ordered change list a proposed schema change that would create a database element prior to a proposed data change that would write a value in that database element;
    places in the ordered change list a proposed change that would reference a database element value prior to a proposed change that would remove that database element.

3. The configured medium of claim 1, wherein the process further comprises:
    obtaining exclusive access to a portion of the multi-user database application environment, the portion having a current state when the exclusive access is obtained; and
    assessing for each proposed change whether all preconditions for that proposed change either exist in the current state or will be caused by proposed change(s) which precede that proposed change in the ordered change list.

4. The configured medium of claim 3, wherein the assessing step locates a proposed change having a precondition which does not exist in the current state and will not be caused by proposed change(s) which precede that proposed change in the ordered change list, and the process further comprises raising an error and preventing the proposed change from being committed.

5. The configured medium of claim 1, wherein the collecting step collects proposed changes in at least two of the following change categories: data changes, schema changes, application changes.

6. The configured medium of claim 1, wherein the collecting step collects, and the committing step commits, at least one proposed change in each of the following change categories: data changes, schema changes, application changes; and wherein the process further comprises getting at least one return value from the committing step.

7. The configured medium of claim 1, wherein the process further comprises getting at least one identifier as a return value from the committing step.

8. A process for making changes in a multi-user database application environment, the process comprising the steps of a particular user of the environment:
observing values of the multi-user database application environment and submitting to an editor multiple proposed changes to at least some observed values of the multi-user database application environment, the proposed changes comprising an application change and also comprising at least one change which is in at least one of the following change categories: data changes, schema changes; and
commanding the editor with a command to commit all of the proposed changes together, as opposed to commanding the editor to commit one of the changes, receiving a response to that command, then commanding the editor to commit another of the changes, receiving a response to that command, and continuing to commit the changes one by one, wherein at least one receiving step comprises at least one of the following:
receiving a response to the commanding step which indicates that a proposed change to change a data value is inconsistent with a change which (a) removed a data element containing the data value and (b) was made after the observing and submitting steps and before the commanding step;
receiving a response to the commanding step which indicates that a proposed change to change a data value is inconsistent with a change which (a) removed a database element containing the data value and (b) was made after the observing and submitting steps and before the commanding step;
receiving a response to the commanding step which indicates that a proposed change to change a data element type is inconsistent with a change which (a) renamed the data element and (b) was made after the observing and submitting steps and before the commanding step;
receiving a response to the commanding step which indicates that a proposed change to change a database element type is inconsistent with a change which (a) renamed the database element and (b) was made after the observing and submitting steps and before the commanding step;
receiving a response to the commanding step which indicates that a proposed change to change an application display rule for a data element is inconsistent with a change which (a) removed a database element and (b) was made after the observing and submitting steps and before the commanding step;
receiving a response to the commanding step which indicates that a proposed change to change an application display rule for a data element is inconsistent with a change which (a) renamed a database element and (b) was made after the observing and submitting steps and before the commanding step.

9. The process of claim 8, wherein the commanding step commands the editor to commit at least one proposed change in each of the following change categories: data changes, schema changes, application changes.

10. The process of claim 8, further comprising receiving from the editor a response indicating that an uncommitted proposed change is inconsistent with a committed change submitted by another user of the environment.

11. The process of claim 8, further comprising specifying at least one relationship between items belonging to one or more of the following categories: data values, schema values, application values; and providing the relationship(s) during the submitting step.

12. The process of claim 11, further comprising updating the relationship using an automatically generated key value.

13. The process of claim 8, wherein the proposed changes comprise an application change and also comprise a schema change.

14. The process of claim 8, wherein the process further comprises indicating that another user of the environment could be contacted because their proposed changes are also involved in a transaction which failed with a consistency error.

15. A computer system comprising:
at least one logical processor;
a memory in operable communication with the logical processor(s), the memory located in at least one machine;
a diff manager residing in the memory and operable to produce diffgrams from user gestures;
a user-specific change buffer residing in the memory and operable to maintain a collection of diffgrams for a specific user and to produce for the specific user views of a multi-user database application environment which reflect the impact that zero or more diffgrams would have on the environment if committed; and
a query-update engine residing in the memory and operable to (a) access a shared multi-user store of values in each of the following categories: data values, schema values, application values, (b) submit value changes in each of these categories to the shared multi-user store, and (c) detect results after an attempt to commit changes in these categories to the shared multi-user store;
the query-update engine also operable to order proposed value changes based on dependencies between proposed value changes, a value change list residing in the memory and containing proposed value changes of each category listed in a commitment order suitable for commitment under a single transaction; and
the system operable to track which values are queried by the user during a period of operation of a multi-user database application, the query-update engine operable to produce value changes which are conditional in that they request commitment only after verifying that the values queried by the user have not changed.

16. The system of claim 15, wherein the system further comprises a value change residing in the memory and including a SQL statement in a context provided by an optimistic concurrency check.

17. The system of claim 15, wherein the query-update engine is operable to produce, and wherein the system further comprises, value changes for relational values of a database.

18. The system of claim 15, wherein the system further comprises: a single transaction containing a value change for a value of a database, a value change for a value of a database schema of the database, and a value change for an application description of an application for accessing the database, each of these value changes having the same user as an author.

19. The system of claim 15, wherein the system further comprises a value change residing in the memory and including a SQL statement in a context provided by a check for consistency with a previous state.

20. The system of claim 15, wherein the query-update engine is operable to produce, and wherein the system further comprises, value changes for graph objects of an application description.

* * * * *